(12) United States Patent
Feng

(10) Patent No.: US 8,986,016 B2
(45) Date of Patent: Mar. 24, 2015

(54) USB HEAD INTERFACE DEVICE AND APPARATUS THEREOF

(75) Inventor: Xiao Feng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/000,307

(22) PCT Filed: Jul. 25, 2011

(86) PCT No.: PCT/CN2011/077563
§ 371 (c)(1),
(2), (4) Date: Aug. 19, 2013

(87) PCT Pub. No.: WO2012/113202
PCT Pub. Date: Aug. 30, 2012

(65) Prior Publication Data
US 2014/0004719 A1    Jan. 2, 2014

(30) Foreign Application Priority Data

Feb. 22, 2011    (CN) .......................... 2011 1 0042562

(51) Int. Cl.
H01R 39/00    (2006.01)
H01R 35/04    (2006.01)
(Continued)

(52) U.S. Cl.
CPC .......... *H01R 35/04* (2013.01); *G06K 19/07732* (2013.01); *G02F 1/136286* (2013.01)
USPC ............................................. 439/11; 439/32

(58) Field of Classification Search
USPC ........................................ 439/11, 32, 31, 534
See application file for complete search history.

(56) References Cited

U.S. PATENT DOCUMENTS 7,247,028 B2 *   7/2007  Schriefer ..................... 439/11
7,494,343 B2 *   2/2009  Schriefer ..................... 439/11
(Continued)

FOREIGN PATENT DOCUMENTS

CN       1596067 A      3/2005
CN     201064050 Y      5/2008
(Continued)

OTHER PUBLICATIONS

International Search Report in international application No. PCT/CN2011/077563, mailed on Nov. 17, 2011.
(Continued)

*Primary Examiner* — Gary Paumen
(74) *Attorney, Agent, or Firm* — Oppedahl Patent Law Firm LLC

(57) ABSTRACT

A Universal Serial Bus (USB) head interface device and an apparatus with the USB head interface device are provided. The USB head interface device includes a USB head component (10) and a tension rod base (20). The tension rod base includes: a first locating groove (21) provided on an inner wall of the tension rod base; an elastic fastening member (30) provided on the inner wall of the tension rod base; a tension rod (40) provided in the tension rod base in a stretchable manner, the tension rod includes a first locating rib (41) provided on an outer wall of the tension rod, and the first locating rib is provided with a structure adaptive to the first locating groove; and a rotating shaft (60) which passes through two first through-holes on a second end of the tension rod to connect the tension rod and the USB head component. Wherein, the elastic fastening member is provided with a structure locking a gear (50). A connecting structure between a USB head and a USB body of the USB interface apparatus is simple and is easy to use.

24 Claims, 5 Drawing Sheets

(51) Int. Cl.
   *G06K 19/077*   (2006.01)
   *G02F 1/1362*   (2006.01)

(56) References Cited

U.S. PATENT DOCUMENTS

| | | | |
|---|---|---|---|
| 7,535,719 B2 | 5/2009 | Hiew | |
| 2004/0048494 A1* | 3/2004 | Yu | 439/11 |
| 2004/0105329 A1 | 6/2004 | Lin et al. | |
| 2008/0093720 A1 | 4/2008 | Hiew | |
| 2008/0194119 A1* | 8/2008 | Mori | 439/13 |
| 2010/0110643 A1 | 5/2010 | Lin | |

FOREIGN PATENT DOCUMENTS

| | | |
|---|---|---|
| CN | 201327940 Y | 10/2009 |
| CN | 201479478 U | 5/2010 |
| CN | 201533049 U | 7/2010 |
| TW | 201019074 A | 5/2010 |

OTHER PUBLICATIONS

English Translation of the Written Opinion of the International Search Authority in international application No. PCT/CN2011/077563, mailed on Nov. 17, 2011.
Supplementary European Search Report in European application No. 11859491.0, mailed on Dec. 1, 2014.

* cited by examiner

USB HEAD INTERFACE DEVICE AND APPARATUS THEREOF

TECHNICAL FIELD

The disclosure relates to the field of electronic products, and in particular to a Universal Serial Bus (USB) head interface device and an apparatus with the USB head interface device.

BACKGROUND

As shown in FIG. 1, a connecting structure for stretching and swing between a USB head and a USB body of a traditional USB head interface device is complex and has poor usability, and can only realize swing on one plane but cannot realize adjustment and use for any angle, which is very inconvenient for use of users.

Along with expansion of wireless internet technologies, network cards rise suddenly in consumer electronics products. Sockets of one computer are dense, and on one apparatus with multiple USB interfaces, interference often occurs between an external apparatus, such as a mouse, a keyboard, a headphone or the like, and an in-line network card. The body of a traditional in-line network card is longer and occupies larger space, which brings great inconvenience to users for daily use and often causes a phenomenon that the USB head of the network card is broken or that a USB cap is lost.

SUMMARY

The main purpose of the disclosure is to provide a USB head interface device to solve the problem that a connecting structure between a USB head and a USB body of the USB interface apparatus in the related art is complex and has poor usability.

In order to achieve the above problem, the technical solution of the disclosure is realized as follows.

A USB head interface device includes a USB head component 10 and a tension rod base 20, wherein
the tension rod base 20 includes:
a first locating groove 21 provided on an inner wall of the tension rod base 20;
an elastic fastening member 30 provided on the inner wall of the tension rod base 20;
a tension rod 40 provided in the tension rod base 20, the tension rod 40 includes a first locating rib 41 provided on an outer wall of the tension rod 40, and the first locating rib 41 is provided with a structure adaptive to the first locating groove 21; and
a rotating shaft 60 which passes through two first through-holes 46 on a second end 44 of the tension rod to connect the tension rod 40 and the USB head component 10.

Preferably, the interface device may include:
a gear 50 sheathed on a first end 43 of the tension rod;
wherein the elastic fastening member 30 is provided with a structure locking the gear 50.

Preferably, the USB head component 10 may include:
a USB head 11; and
a connecting part 13 connected with the USB head 11, the connecting part 13 is provided with a second through-hole 15 which is connected with the rotating shaft 60.

Preferably, the USB head component 10 may include:
a second locating groove 17 provided on the connecting part 13; and
a second locating rib 47 provided on the second end 44 of the tension rod, and the second locating rib 47 is provided with a structure adaptive to the second locating groove 17.

Preferably, the second locating groove 17 and the second locating rib 47 may be rubber parts.

Preferably, the elastic fastening member 30 may be a spring pin, and the rotating shaft 60 may be a pin.

Preferably, the tension rod base 20 may include:
a third through-hole 23 provided on a side wall of the tension rod base 20, wherein the elastic fastening member 30 is provided in the third through-hole 23.

Preferably, the tension rod base 20 may include:
a limit stop 25 prominently provided on an end face 27 of the tension rod base close to the USB head component 10.

Preferably, the interface device may include:
an upper spring collar 70 provided in a first annular neck 48 on the outer wall of the tension rod 40; and
a lower spring collar 80 provided in a second annular neck 49 on the outer wall of the tension rod 40;
wherein the gear 50 is provided between the upper spring collar 70 and the lower spring collar 80.

An apparatus includes an apparatus housing 90 and a USB head 11 installed on the apparatus housing 90, wherein the apparatus further includes a USB head component 10 and a tension rod base 20, wherein
the tension rod base 20 includes:
a first locating groove 21 provided on an inner wall of the tension rod base 20;
an elastic fastening member 30 provided on the inner wall of the tension rod base 20;
a tension rod 40 provided in the tension rod base 20, the tension rod 40 includes a first locating rib 41 provided on an outer wall of the tension rod 40, and the first locating rib 41 is provided with a structure adaptive to the first locating groove 21; and
a rotating shaft 60 which passes through two first through-holes 46 on a second end 44 of the tension rod to connect the tension rod 40 and the USB head component 10.

Preferably, the apparatus may include:
a gear 50 sheathed on a first end 43 of the tension rod;
wherein the elastic fastening member 30 is provided with a structure locking the gear 50.

Preferably, the USB head component 10 may include:
a USB head 11; and
a connecting part 13 connected with the USB head 11, the connecting part 13 is provided with a second through-hole 15 which is connected with the rotating shaft 60.

Preferably, the USB head component 10 may include:
a second locating groove 17 provided on the connecting part 13; and
a second locating rib 47 provided on the second end 44 of the tension rod, and the second locating rib 47 is provided with a structure adaptive to the second locating groove 17.

Preferably, the tension rod base 20 may include:
a limit stop 25 prominently provided on an end face 27 of the tension rod base close to the USB head component 10.

By means of cooperation of the USB head and the stretchable and rotatable tension rod, the disclosure solves the problem that the connecting structure between the USB head and the USB body of the USB interface apparatus in the related art is complex and has poor usability, so that the connecting structure between the USB head and the USB body of the USB interface apparatus is simple and is easy to use, and the USB head not only has stretching and swing functions and but also has stretching and rotation functions, thereby achieving the effect that the USB head can be regulated and used in multiple angles.

EXPLANATION OF REFERENCE SIGNS

Figure 1:
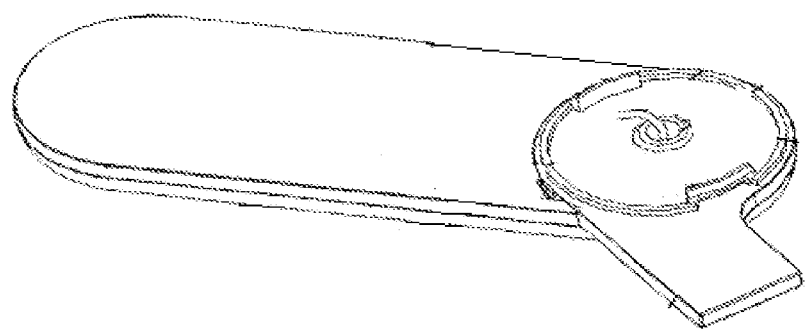
FIG. 1 shows a schematic diagram of a USB head interface device in the related art.

| 10 | USB head component | 11 | USB head | 13 | connecting part |
|---|---|---|---|---|---|
| 15 | second through-hole | 17 | second locating groove | 20 | tension rod base |
| 21 | first locating groove | 23 | third through-hole | 25 | limit stop |
| 27 | end face of the tension rod base | 30 | elastic fastening member | 40 | tension rod |
| 41 | first locating rib | 43 | first end of the tension rod | 44 | second end of the tension rod |
| 45 | protrusion | 46 | first through-hole | 47 | second locating rib |
| 48 | first annular neck | 49 | second annular neck | 50 | gear |
| 60 | rotating shaft | 70 | upper spring collar | 80 | lower spring collar |
| 90 | body of a housing of a network card | | | | |

DETAILED DESCRIPTION

In order to make the technical problem to be solved, solution and beneficial effects of the disclosure more clear and understood, the disclosure is be further illustrated in combination with the drawings and embodiments below. It should be understood that the specific embodiments described here are merely used to explain the disclosure instead of limiting the disclosure.

The disclosure provides a stretchable and rotatable USB head interface device which realizes a serial of actions such as a retraction state→a stretching state→a rotation state→a swing state and the like; in an example, the disclosure provides an apparatus with the interface device.

The disclosure provides a USB head interface device which includes a USB head component 10 and a tension rod base 20, wherein the tension rod base 20 includes: a first locating groove 21 provided on an inner wall of the tension rod base 20; an elastic fastening member 30 provided on the inner wall of the tension rod base 20; a tension rod 40 provided in the tension rod base 20 in a stretchable manner, the tension rod 40 includes a first locating rib 41 provided on an outer wall of the tension rod 40, the first locating rib 41 is provided with a structure adaptive to the first locating groove 21; and a rotating shaft 60 which passes through two first through-holes 46 on a second end 44 of the tension rod to connect the tension rod 40 and the USB head component 10; wherein, the elastic fastening member 30 is provided with a structure locking the gear 50. The above embodiment solves the problem that the connecting structure between the USB head and the USB body of the USB interface apparatus in the related art is complex and has poor usability.

Preferably, the apparatus of the above embodiment may include a gear 50 sheathed on a first end 43 of the tension rod. Preferably the embodiment solves the problem that the USB head cannot be regulated and used in multiple angles because the USB head can only realize swing on one plane.

Figure 2:
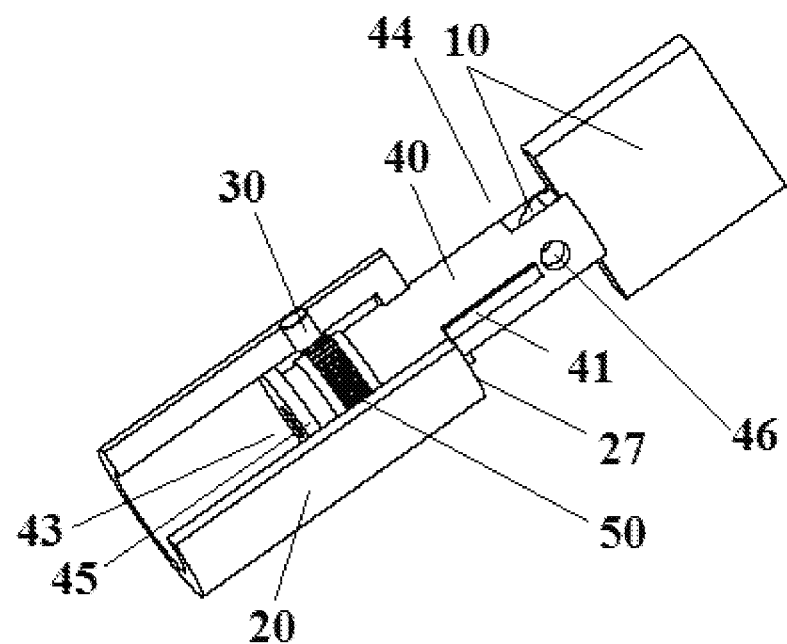
FIG. 2 shows a sectional view of a USB head interface device in a stretching state according to an embodiment of the disclosure.

Specifically, FIG. 2 shows a sectional view of a USB head interface device in a stretching state according to a preferable embodiment of the disclosure, and the USB head interface device of the preferable embodiment includes a USB head component 10 and a tension rod base 20, wherein the tension rod base 20 includes: a first locating groove 21 (not shown in FIG. 2) provided on an inner wall of the tension rod base 20, the first locating groove 21 is preferably provided on the inner wall of the tension rod base 20 longitudinally and perpendicularly; an elastic fastening member 30 provided on the inner wall of the tension rod base 20, the elastic fastening member 30 is provided with elastically stretchable and compressing functions and the elastic fastening member 30 may preferably be a spring pin; a tension rod 40 provided in the tension rod base 20, the tension rod 40 includes a first locating rib 41 provided on an outer wall of the tension rod 40, the first locating rib 41 is provided with a structure adaptive to the first locating groove 21, preferably, the first locating rib 41 is provided on the outer wall of the tension rod 40 longitudinally and perpendicularly, and the first locating rib 41 may be provided in the first locating groove 21 slidably up and down, by means of the sliding up and down of the first locating rib 41 in the first locating groove 21, the stretching and retraction up and down of the tension rod 40 in the tension rod base 20 is realized, and the first locating groove 21 is open on an end face 27 of the tension rod base close to the USB head component 10, which can make room for the first locating rib 41 when the tension rod 40 is pulled out from the tension rod base 20; a gear 50 sheathed on an outer wall of a first end 43 of the tension rod far away from a USB head, when the first locating rib 41 is pulled out from the first locating groove 21, the rotation function of the tension rod 40 in the tension rod base 20 can be realized by the gear 50; when the first locating rib 41 is not pulled out from the first locating groove 21, the first locating rib 41 and the first locating groove 21 are in an engagement state, and the tension rod 40 cannot be rotated and can only be stretched; and a rotating shaft 60 (not shown in FIG. 2) which passes through two first through-holes 46 on a second end 44 of the tension rod to connect the tension rod 40 and the USB head component 10, the USB head component can swing left and right on the same plane around the rotating shaft 60 by fastening the rotating shaft 60; wherein the elastic fastening member 30 is provided with a structure locking the gear 50, and cooperation of the elastic fastening member 30 and the gear 50 realizes a locating function of the tension rod 40 when it is rotated in the tension rod base 20.

Figure 3:
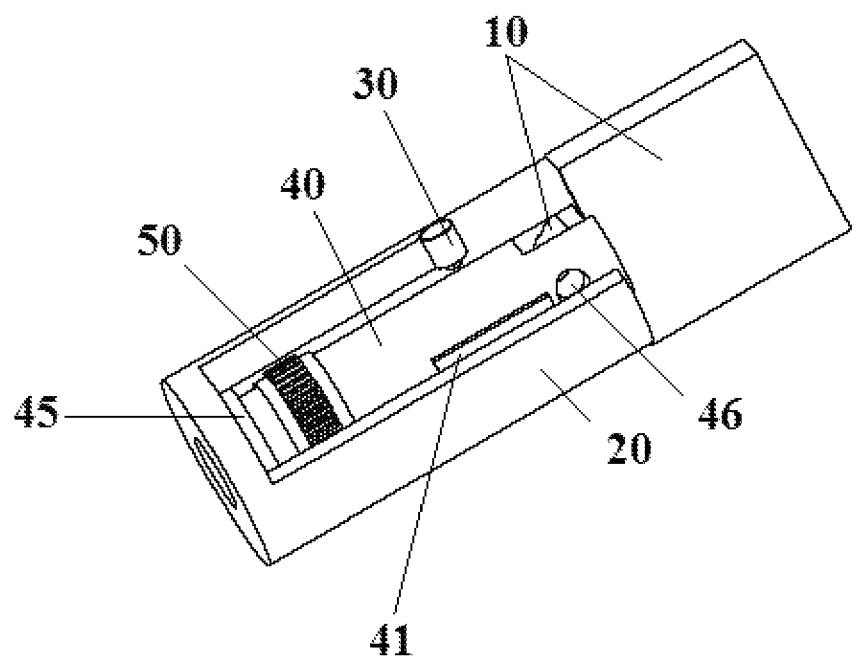
FIG. 3 shows a sectional view of a USB head interface device in a retraction state according to an embodiment of the disclosure.

FIG. 3 shows a sectional view of a USB head interface device in a retraction state according to a preferable embodiment of the disclosure. When the first locating rib 41 is not pulled out from the first locating groove 21 (not shown in FIG. 3), the tension rod 40 cannot be rotated, the first locating rib 41 and the first locating groove 21 are in the engagement state, and the tension rod 40 is completely retracted in the tension rod base 20.

As shown in combination with FIG. 2 and FIG. 3, since the USB head not only has the swing function but also has the stretching and rotation functions, the range of regulation and use is larger.

By means of cooperation of the USB head and the stretchable and rotatable tension rod, the disclosure solves the problem in the related art that the USB head cannot be regulated and used in multiple angles because the USB head can only realize swing on one plane, so that the USB head not only has the swing function but also has the stretching and rotation functions, thereby achieving the effect that the USB head can be regulated and used in multiple angles.

Figure 4:
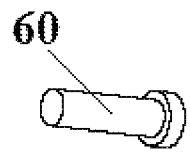
FIG. 4 shows a structural diagram of a pin of a USB head interface device according to an embodiment of the disclosure.

As shown in FIG. 4, the rotating shaft 60 is preferably a pin, which has a low cost and reliable strength.

Figure 5:
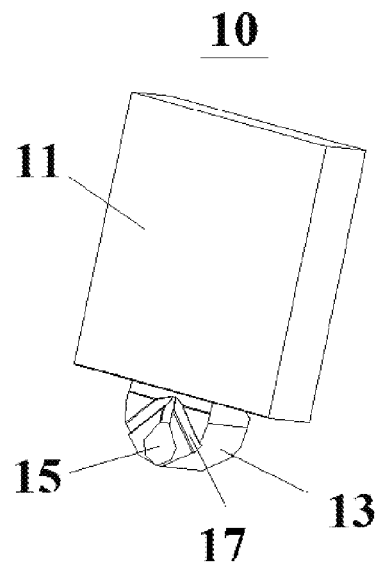
FIG. 5 shows a structural diagram of a USB head component of a USB head interface device according to an embodiment of the disclosure.

As shown in FIG. 5, the USB head component 10 includes a USB head 11 and a connecting part 13. The connecting part 13 is provided with a second through-hole 15, and the rotating shaft 60 passes through the second through-hole 15 and two first through-holes 46 (not shown in FIG. 5) on the second end 44 (not shown in FIG. 5) of the tension rod to connect the USB head 11 and the connecting part 13.

Figure 6:
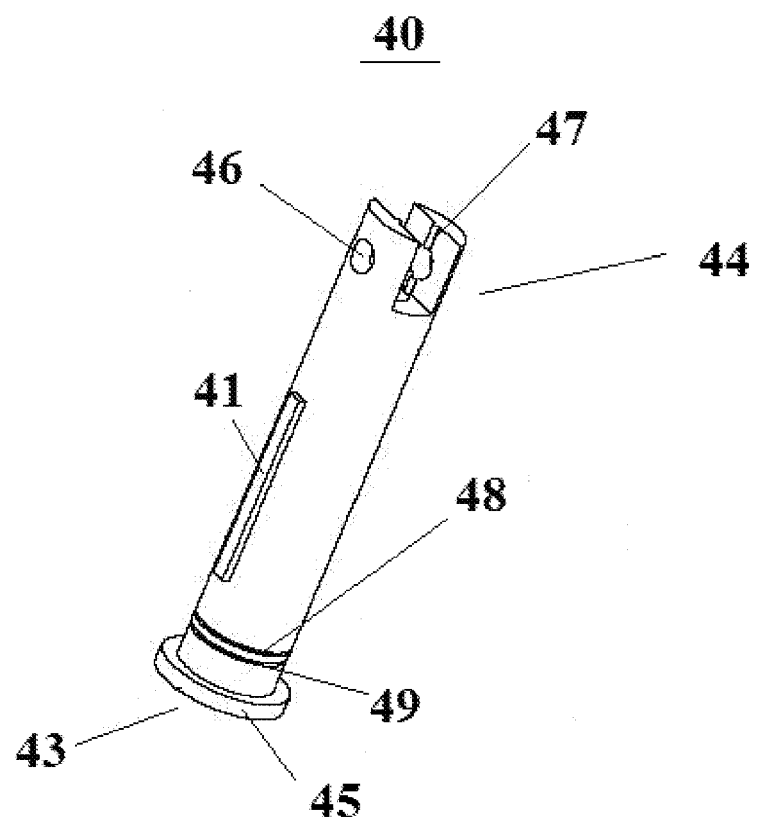
FIG. 6 shows a structural diagram of a tension rod of a USB head interface device according to an embodiment of the disclosure.

As shown in FIG. 5, a second locating groove 17 is preferably provided on the connecting part 13, as shown in FIG. 6, a second locating rib 47 is preferably provided on the second end 44 of the tension rod. The second locating rib 47 is provided with a structure adaptive to the second locating groove 17, and locating of the USB head during swing is realized by cooperation of the second locating groove 17 and the second locating rib 47. Preferably, the second locating groove 17 and the second locating rib 47 are rubber parts to ensure that the USB head can be fastened at any set angle during the swing.

As shown in FIG. 6, one end of the tension rod 40 far away from the USB head is preferably provided with a protrusion 45, and the protrusion 45 is preferably cylindrical to prevent that the tension rod 40 is pulled out from the tension rod base in use.

Figure 7:
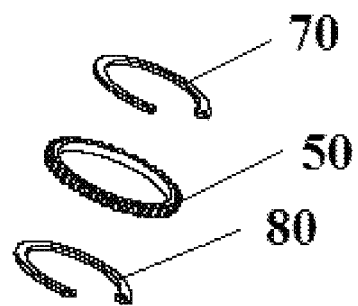
FIG. 7 shows a structural diagram of a gear of a USB head interface device according to an embodiment of the disclosure.

As shown in FIG. 6, two annular necks, i.e., a first annular neck 48 and a second annular neck 49, are preferably provided on an outer wall of one end of the tension rod 40 far away from the USB head respectively. As shown in FIG. 7, an upper spring collar 70 is provided in the first annular neck 48 on the outer wall of the tension rod 40, a lower spring collar 80 is provided in the second annular neck 49 on the outer wall of the tension rod 40, and the gear 50 is provided between the upper spring collar 70 and the lower spring collar 80. The upper spring collar 70 and the lower spring collar 80 serve as fastening the gear 50 on the tension rod 40.

Figure 8:
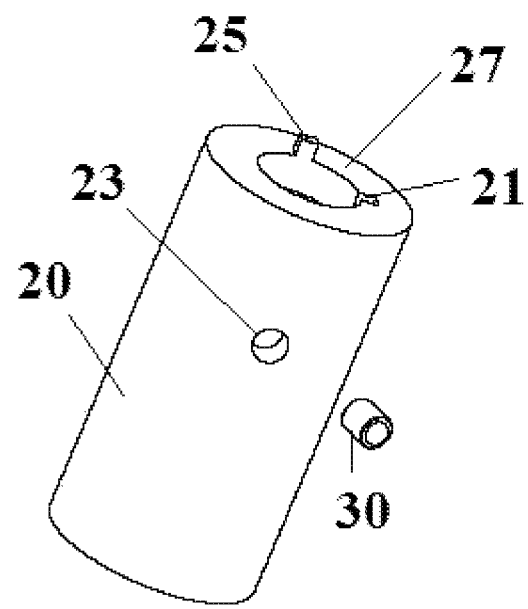
FIG. 8 shows a structural diagram of a tension rod base of a USB head interface device according to an embodiment of the disclosure.

As shown in FIG. 8, preferably, the tension rod base 20 includes a third through-hole 23 provided on a side wall of the tension rod base 20, wherein the elastic fastening member 30 is provided in the third through-hole 23, which facilitates removable maintaining and replacement of the elastic fastening member, such as removable maintaining and replacement of the spring pin and the like.

Since four data lines of the USB head pass through the tension rod 40 and an inner cavity of the tension rod base 20 successively to connect with a mainboard PCB, in order to avoid tanglement and winding of the four data lines of the USB head, as shown in FIG. 8, preferably, the tension rod base 20 includes a limit stop 25. The limit stop 25 is prominently provided on an end face 27 of the tension rod base close to the USB head component 10. The first locating groove 21 is open on the end face 27 of the tension rod base close to the USB head component 10, which can make room for the first locating rib 41 when the tension rod 40 is pulled out from the tension rod base 20. Cooperation of the limit stop 25 and the first locating rib 41 confines unlimited rotation of the tension rod 40 in one direction relative to the tension rod base 20, and the tension rod 40 can only rotate approximately 360 degrees in one direction and returns approximately 360 degrees in a reverse direction again.

According to another aspect of the disclosure, an apparatus is provided, which includes an apparatus housing 90 and a USB head 11 installed on the apparatus housing 90, and the apparatus further includes: a USB head component 10 and a tension rod base 20, wherein the tension rod base 20 includes: a first locating groove 21 provided on an inner wall of the tension rod base 20; an elastic fastening member 30 provided on the inner wall of the tension rod base 20; a tension rod 40 provided in the tension rod base 20, the tension rod 40 includes a first locating rib 41 provided on an outer wall of the tension rod 40, the first locating rib 41 is provided with a structure adaptive to the first locating groove 21; and a rotating shaft 60 which passes through two first through-holes 46 on a second end 44 of the tension rod to connect the tension rod 40 and the USB head component 10.

Preferably, the apparatus includes: a gear 50 sheathed on a first end 43 of the tension rod; and the elastic fastening member 30 is provided with a structure locking the gear 50.

Preferably, the USB head component 10 includes: a USB head 11; and a connecting part 13 connected with the USB head 11, the connecting part 13 is provided with a second through-hole 15 which is connected with the rotating shaft 60.

Preferably, the apparatus includes: a second locating groove 17 provided on the connecting part 13; and a second locating rib 47 provided on the second end 44 of the tension rod, the second locating rib 47 is provided with a structure adaptive to the second locating groove 17.

Preferably, the tension rod base 20 includes: a limit stop 25 which is prominently provided on an end face 27 of the tension rod base close to the USB head component 10.

The apparatus may be an electronic product required to be installed a USB head, such as a network card, a U disk, a mobile hard disk or the like.

Figure 9:
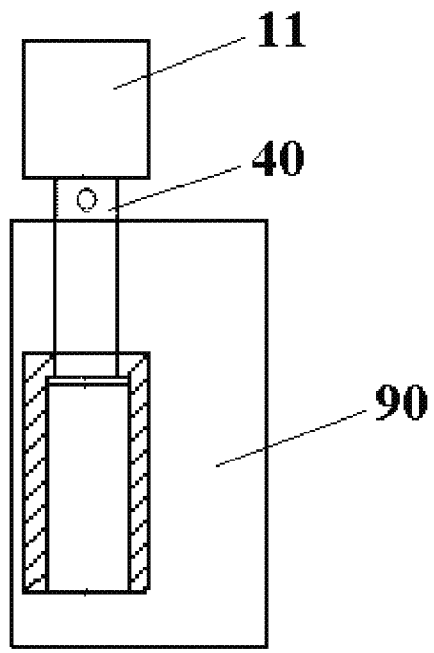
FIG. 9 shows a structural diagram of a USB head which is pulled out a housing of a network card according to an embodiment of the disclosure.

According to a preferable embodiment of the disclosure, a network card which includes the above interface device is provided. As shown in FIG. 9, the USB head 11 is pulled out from the cavity of the housing 90 by vertical ascent of the tension rod 40, when the USB head 11 is in use, the USB head 11 can be manually regulated to rotate approximately 360 degrees clockwise and anticlockwise and be swung left and right greater than 90 degrees on one plane, and a user can select a suitable angle by oneself to insert the network card into a computer.

Figure 10:
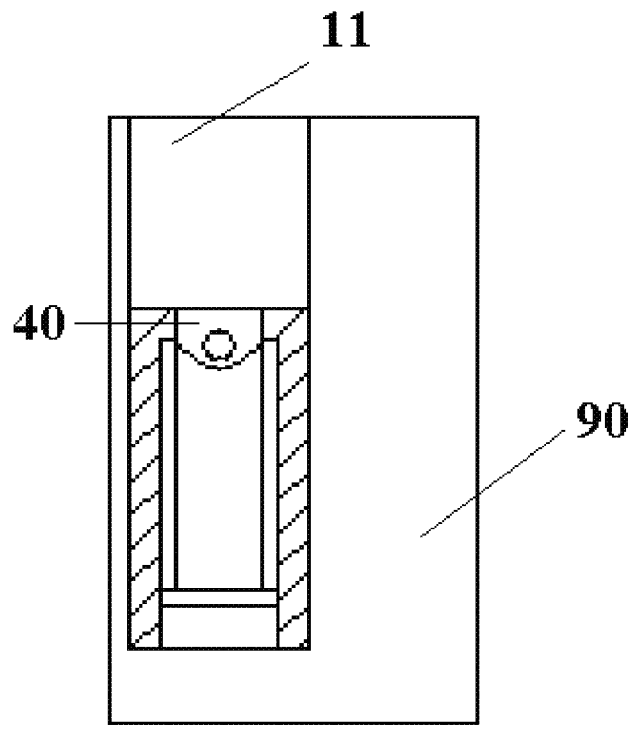
FIG. 10 shows a structural diagram of a USB head which is hidden in a housing of a network card according to an embodiment of the disclosure.

As shown in FIG. 10, when the network card is stopped to use, the USB head 11 is rotated to an initiate pull-out position (which is marked at a housing of a complete machine) by vertical descent of the tension rod 40 to make the USB head 11 retract into the cavity of the housing 90, and the USB head 11 is in a protected state. An upper end of the USB head 11 in the housing 90 of the network card is open to provide a path that the USB head 11 stretches out from or hides in the housing 90.

The USB head of the preferable embodiment can implement ascent and descent, and the USB head is pulled out from the housing when being used and can be retracted into the housing when being not used; therefore, space occupied by such network card is small, and the USB head is difficult to be damaged and does not need a USB cap. Furthermore, such network card has a nice appearance and a simple and reliable structure, facilitates to hide the USB head, and also realizes rotation of 360 degrees, stretching and swing functions of the USB head.

Materials of devices in all above embodiments of the disclosure may be metal or plastics.

It can be seen from the above description that the above embodiments of the disclosure realize the following technical effects:

1. by means of cooperation of the USB head and the stretchable and rotatable tension rod, the disclosure solves the problem in the related art that the USB head cannot be regulated and used in multiple angles because the USB head can only realize swing on one plane, so that the USB head not only has the swing function but also has the stretching and rotation functions, thereby achieving the effect that the USB head can be regulated and used in multiple angles; and 2. since the above rotatable and stretchable USB head is adopted in the apparatus, the USB head can be hided in the housing of the apparatus, which saves a cap of the USB head and realizes reduction of the size of the complete machine, and pulling the USB head out can realize that the USB head is rotated approximately 360 degrees in a horizontal plane and is rotated greater than 90 degrees perpendicularly and that the USB head is inserted in a narrow space to use in multiple angles; furthermore, the apparatus has a novel and nice appearance and is convenient to use.

The above description shows and describes preferable embodiments of the disclosure. As previously mentioned, it should be understood that the disclosure is not confined to the description disclosed herein and should not be considered as exclusion of other embodiments, the disclosure can be applied to all other combinations, amendments and environments and can be modified according to the above teaching or technologies or knowledge of related fields within the conception of the disclosure. Any modifications or variations made by those skilled in the art within the spirit and principle of the disclosure shall fall within the scope of protection of the disclosure.

What is claimed is:

1. A Universal Serial Bus (USB) head interface device comprising: a USB head component (10) and a tension rod base (20), wherein the tension rod base (20) comprises:
   a first locating groove (21) provided on an inner wall of the tension rod base (20);
   an elastic fastening member (30) provided on the inner wall of the tension rod base (20);
   a tension rod (40) provided in the tension rod base (20), the tension rod (40) comprises a first locating rib (41) provided on an outer wall of the tension rod (40), and the first locating rib (41) is provided with a structure adaptive to the first locating groove (21); and
   a rotating shaft (60) which passes through two first through-holes (46) on a second end (44) of the tension rod to connect the tension rod (40) and the USB head component (10).

2. The interface device according to claim 1, further comprising:
   a gear (50) sheathed on a first end (43) of the tension rod;
   wherein the elastic fastening member (30) is provided with a structure locking the gear (50).

3. The interface device according to claim 1, wherein the USB head component (10) comprises:
   a USB head (11); and
   a connecting part (13) connected with the USB head (11), the connecting part (13) is provided with a second through-hole (15) which is connected with the rotating shaft (60).

4. The interface device according to claim 3, wherein the USB head component (10) further comprises:
   a second locating groove (17) provided on the connecting part (13); and
   a second locating rib (47) provided on the second end (44) of the tension rod, and the second locating rib (47) is provided with a structure adaptive to the second locating groove (17).

5. The interface device according to claim 4, wherein the second locating groove (17) and the second locating rib (47) are rubber parts.

6. The interface device according to claim 1, wherein the elastic fastening member (30) is a spring pin, and the rotating shaft (60) is a pin.

7. The interface device according to claim 1, wherein the tension rod base (20) further comprises:
   a third through-hole (23) provided on a side wall of the tension rod base (20), wherein the elastic fastening member (30) is provided in the third through-hole (23).

8. The interface device according to claim 7, wherein the tension rod base (20) further comprises:
   a limit stop (25) prominently provided on an end face (27) of the tension rod base close to the USB head component (10).

9. The interface device according to claim 1, further comprising:
   an upper spring collar (70) provided in a first annular neck (48) on the outer wall of the tension rod (40); and
   a lower spring collar (80) provided in a second annular neck (49) on the outer wall of the tension rod (40);
   wherein the gear (50) is provided between the upper spring collar (70) and the lower spring collar (80).

10. The interface device according to claim 2, further comprising:
    an upper spring collar (70) provided in a first annular neck (48) on the outer wall of the tension rod (40); and
    a lower spring collar (80) provided in a second annular neck (49) on the outer wall of the tension rod (40);
    wherein the gear (50) is provided between the upper spring collar (70) and the lower spring collar (80).

11. The interface device according to claim 3, further comprising:
    an upper spring collar (70) provided in a first annular neck (48) on the outer wall of the tension rod (40); and
    a lower spring collar (80) provided in a second annular neck (49) on the outer wall of the tension rod (40);
    wherein the gear (50) is provided between the upper spring collar (70) and the lower spring collar (80).

12. The interface device according to claim 4, further comprising:

an upper spring collar (70) provided in a first annular neck (48) on the outer wall of the tension rod (40); and a lower spring collar (80) provided in a second annular neck (49) on the outer wall of the tension rod (40);

wherein the gear (50) is provided between the upper spring collar (70) and the lower spring collar (80).

13. The interface device according to claim 5, further comprising:

an upper spring collar (70) provided in a first annular neck (48) on the outer wall of the tension rod (40); and a lower spring collar (80) provided in a second annular neck (49) on the outer wall of the tension rod (40);

wherein the gear (50) is provided between the upper spring collar (70) and the lower spring collar (80).

14. The interface device according to claim 6, further comprising:

an upper spring collar (70) provided in a first annular neck (48) on the outer wall of the tension rod (40); and a lower spring collar (80) provided in a second annular neck (49) on the outer wall of the tension rod (40);

wherein the gear (50) is provided between the upper spring collar (70) and the lower spring collar (80).

15. The interface device according to claim 7, further comprising:

an upper spring collar (70) provided in a first annular neck (48) on the outer wall of the tension rod (40); and a lower spring collar (80) provided in a second annular neck (49) on the outer wall of the tension rod (40);

wherein the gear (50) is provided between the upper spring collar (70) and the lower spring collar (80).

16. The interface device according to claim 8, further comprising:

an upper spring collar (70) provided in a first annular neck (48) on the outer wall of the tension rod (40); and a lower spring collar (80) provided in a second annular neck (49) on the outer wall of the tension rod (40);

wherein the gear (50) is provided between the upper spring collar (70) and the lower spring collar (80).

17. An apparatus, comprising an apparatus housing (90) and a Universal Serial Bus (USB) head (11) installed on the apparatus housing (90), further comprising:

a USB head component (10) and a tension rod base (20), wherein the tension rod base (20) comprises:

a first locating groove (21) provided on an inner wall of the tension rod base (20);

an elastic fastening member (30) provided on the inner wall of the tension rod base (20);

a tension rod (40) provided in the tension rod base (20), the tension rod (40) comprises a first locating rib (41) provided on an outer wall of the tension rod (40), and the first locating rib (41) is provided with a structure adaptive to the first locating groove (21); and a rotating shaft (60) which passes through two first through-holes (46) on a second end (44) of the tension rod to connect the tension rod (40) and the USB head component (10).

18. The apparatus according to claim 17, further comprising:

a gear (50) sheathed on a first end (43) of the tension rod;

wherein the elastic fastening member (30) is provided with a structure locking the gear (50).

19. The apparatus according to claim 17, wherein the USB head component (10) comprises:

a USB head (11); and a connecting part (13) connected with the USB head (11), the connecting part (13) is provided with a second through-hole (15) which is connected with the rotating shaft (60).

20. The apparatus according to claim 19, wherein the USB head component (10) further comprises:

a second locating groove (17) provided on the connecting part (13); and a second locating rib (47) provided on the second end (44) of the tension rod, and the second locating rib (47) is provided with a structure adaptive to the second locating groove (17).

21. The apparatus according to claim 17, wherein the tension rod base (20) further comprises:

a limit stop (25) prominently provided on an end face (27) of the tension rod base close to the USB head component (10).

22. The apparatus according to claim 18, wherein the USB head component (10) comprises:

a USB head (11); and a connecting part (13) connected with the USB head (11), the connecting part (13) is provided with a second through-hole (15) which is connected with the rotating shaft (60).

23. The apparatus according to claim 22, wherein the USB head component (10) further comprises:

a second locating groove (17) provided on the connecting part (13); and a second locating rib (47) provided on the second end (44) of the tension rod, and the second locating rib (47) is provided with a structure adaptive to the second locating groove (17).

24. The apparatus according to claim 18, wherein the tension rod base (20) further comprises:

a limit stop (25) prominently provided on an end face (27) of the tension rod base close to the USB head component (10).

\* \* \* \* \*